Patented Sept. 4, 1923.

1,466,748

UNITED STATES PATENT OFFICE.

PAUL ONNERTZ, OF BERLIN-WILMERSDORF, ALFRED PETERS, OF BERLIN, AND BENNO SCHWÄRTZEL, OF BERLIN-WILMERSDORF, GERMANY, ASSIGNORS TO ACTIEN GESELLSCHAFT FÜR ANILIN FABRIKATION, OF BERLIN, GERMANY.

METHOD OF PROTECTING ANIMAL FIBER.

No Drawing.    Application filed June 10, 1922.   Serial No. 567,400.

*To all whom it may concern:*

Be it known that we, PAUL ONNERTZ, ALFRED PETERS and BENNO SCHWÄRTZEL, citizens of the German Republic, residing at Berlin-Wilmersdorf, Germany, and Berlin, Germany, our P. O. addresses being Dusseldorferstrasse 72, Berlin-Wilmersdorf, Germany, and Groben Ufer 4, Berlin, Germany, and Amsterdamerstrasse 2, Berlin, Germany, have invented certain new and useful Improvements in Methods of Protecting Animal Fiber, of which the following is a specification.

In German Letters Patent 144,485 it is shown that sheep wool or other fiber consisting of keratin may be protected from the deleterious effect of alkaline liquids by subjecting it previously to the action of formaldehyde solution or formaldehyde vapor. A more highly concentrated and hotter alkali solution may then be used than is possible without such preliminary treatment.

By the present invention compounds of the general formula:

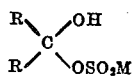

(R meaning univalent substituents such as hydrogen, alkyl, aryl and Me meaning a metal) are used for protecting animal fibers which are treated with alkaline liquids, from being damaged by the alkali. They may be applied in all cases where animal fibers are being treated with alkaline liquids, for example in the washing of wool, the mercerizing of half-wool or half-silk, the degumming of silk, the tanning of hides, the dyeing of half-wool by the single bath process, and the like operations.

The mode of action of the bisulfite compounds of the given formula has not been explained. At all events it is not to be regarded as identical with that of formaldehyde; for if formaldehyde solution and formaldehyde bisulfite solution of the same content as regards formaldehyde are prepared and the same proportion of each solution is added to separate liquors in which wool is treated with soda lye, the protective effect of the formaldehyde bisulfite solution is about twice as great as that of the formaldehyde solution. In the case of acetone no protective effect is observed; in the case of its bisulfite compound, however, this effect appears. The observed effect is not to be explained by a partial neutralization of the alkali due to the decomposition of the bisulfite compound, for the proportion of bisulfite concerned plays no part as compared with the excess of alkali, and effervescence of sodium carbonate baths or elimination of sulfureted hydrogen or of sulfur in sodium sulfide baths cannot be detected, as would be the case if neutralization was the effect.

The following is an example of the invention:

Unscoured wool is treated for half an hour at 50° C. with 60 times its weight of a solution which contains per litre 1 gram of anhydrous sodium carbonate and 0.5 gram of a formaldehyde bisulfite solution of 27% strength (made by mixing 806 volumes of sodium bisulfite solution of 25.8% strength with 178 volumes of formaldehyde solution of 33.6% strength), and is then squeezed out and rinsed until the water runs off clear. After this treatment the wool proves to be sufficiently degreased without depreciation of its natural properties, such as lustre and elasticity.

Other aldehyde bisulfite compounds or ketone bisulfite compounds, for example furfurol bisulfite or acetone bisulfite may be applied in a similar manner.

What we claim is,—

1. A method of protecting animal fiber which is treated with alkaline liquids consisting in adding to the alkaline liquid a compound of the general formula:

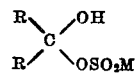

in which R means a univalent substituent and M means a metal.

2. A method of protecting animal fiber which is treated with alkaline liquids consisting in adding to the alkaline liquid an aldehyde bisulfite compound.

3. A method of protecting animal fiber which is treated with alkaline liquids consisting in adding to the alkaline liquid a formaldehyde bisulfite compound.

In testimony whereof we affix our signatures in presence of two witnesses.

PAUL ONNERTZ.
ALFRED PETERS.
BENNO SCHWÄRTZEL.

Witnesses:
E. HALTZERMAN,
ARTHUR SHROEDER.